(12) United States Patent
Ravi

(10) Patent No.: US 11,544,573 B2
(45) Date of Patent: *Jan. 3, 2023

(54) PROJECTION NEURAL NETWORKS

(71) Applicant: Google LLC, Mountain View, CA (US)

(72) Inventor: Sujith Ravi, Santa Clara, CA (US)

(73) Assignee: Google LLC, Mountain View, CA (US)

(*) Notice: Subject to any disclaimer, the term of this patent is extended or adjusted under 35 U.S.C. 154(b) by 319 days.

This patent is subject to a terminal disclaimer.

(21) Appl. No.: 16/926,908

(22) Filed: Jul. 13, 2020

(65) Prior Publication Data

US 2020/0349450 A1     Nov. 5, 2020

Related U.S. Application Data

(63) Continuation of application No. 15/983,441, filed on May 18, 2018, now Pat. No. 10,748,066.

(Continued)

(51) Int. Cl.
*G06N 3/08*     (2006.01)
*G06N 3/10*     (2006.01)
(Continued)

(52) U.S. Cl.
CPC ............... *G06N 3/10* (2013.01); *G06F 17/16* (2013.01); *G06N 3/0454* (2013.01); *G06N 3/08* (2013.01); *G06N 3/084* (2013.01); *G06N 3/04* (2013.01)

(58) Field of Classification Search
CPC ...... G06N 20/00; G06N 20/10; G06N 3/0454; G06N 3/08
See application file for complete search history.

(56) References Cited

U.S. PATENT DOCUMENTS 9,842,106 B2   12/2017   Hori
9,990,687 B1    6/2018   Kaufhold
(Continued)

FOREIGN PATENT DOCUMENTS

CN   102393908 A    3/2012
CN   104538028      4/2015
(Continued)

OTHER PUBLICATIONS

Neumann, Klaus, Christian Emmerich, and Jochen J. Steil. "Regularization by intrinsic plasticity and its synergies with recurrence for random projection methods." (2012). (Year: 2012).*
(Continued)

*Primary Examiner* — Michael J Huntley
*Assistant Examiner* — Oluwatosin O Alabi
(74) *Attorney, Agent, or Firm* — Fish & Richardson P.C.

(57) ABSTRACT

Methods, systems, and apparatus, including computer programs encoded on a computer storage medium, for a projection neural network. In one aspect, a projection neural network is configured to receive a projection network input and to generate a projection network output from the projection network input. The projection neural network includes a sequence of one or more projection layers. Each projection layer has multiple projection layer parameters, and is configured to receive a layer input, apply multiple projection layer functions to the layer input, and generate a layer output by applying the projection layer parameters for the projection layer to the projection function outputs.

20 Claims, 5 Drawing Sheets

Related U.S. Application Data

(60) Provisional application No. 62/517,635, filed on Jun. 9, 2017, provisional application No. 62/509,058, filed on May 20, 2017.

(51) Int. Cl.
*G06F 17/16* (2006.01)
*G06N 3/04* (2006.01)

(56) References Cited

U.S. PATENT DOCUMENTS

| | | | |
|---|---|---|---|
| 2014/0067735 | A1 | 3/2014 | Yu et al. |
| 2014/0156575 | A1 | 6/2014 | Sainath et al. |
| 2015/0074027 | A1 | 3/2015 | Huang et al. |
| 2016/0078339 | A1 | 3/2016 | Li et al. |
| 2016/0110643 | A1* | 4/2016 | Basu ............ G06F 17/16 706/22 |
| 2016/0307564 | A1 | 10/2016 | Sethy et al. |
| 2016/0307566 | A1 | 10/2016 | Bellegarda |
| 2017/0132528 | A1 | 5/2017 | Aslan et al. |
| 2018/0121799 | A1* | 5/2018 | Hashimoto .......... G06N 3/0454 |
| 2018/0150744 | A1 | 5/2018 | Orr |
| 2018/0356771 | A1* | 12/2018 | Basu .................... G05B 13/027 |

FOREIGN PATENT DOCUMENTS

| | | |
|---|---|---|
| EP | 3144859 | 3/2017 |
| JP | H11134314 A | 5/1999 |
| WO | WO 1993/13487 | 7/1993 |
| WO | WO9912085 A2 | 3/1999 |

OTHER PUBLICATIONS

Zhu S, Kang BN, Kim D. A deep neural network based hashing for efficient image retrieval. In2016 IEEE International Conference on Systems, Man, and Cybernetics (SMC) Oct. 9, 2016 (pp. 002483-002488). IEEE. (Year: 2016).*

'blog.google' [online] "Android wear 2.0: Make the most of every minute," David Singleton, Feb. 8, 2017, [Retrieved on May 22, 2018] Retrieved from Internet: URL<https://blog.google/products/android-wear/adroid-wear-20-make-most-every-minute> 8 pages.

'www.cs.toronto.edu' [online] "The cifar dataset," Alex Krizhevsky, 2009, [retrieved on May 22, 2018] Retrieved from Internet: URL<http://www.cs.toronto.edu/~kriz/cifar.html> 4 pages.

'www.quora.com' [online] "What does Dr. Hinton mean by hard vs soft targets," May 12, 2015, [retrieved on Jul. 12, 2018] Retrieved from Internet: URL<https://www.quora.com/what-does-Dr-hinton-mean0by-hard-vs-soft-targets> 2 pages.

'yann.lecun.com' [online] "The mnist database of handwritten digits," Available on or before Jun. 22, 2002 [Retrieved on May 22, 2018] Retrieved from Internet: URL<http://yann.lecun.com/exdb/mnist/> 8 pages.

Abadi et al. "TensorFlow: Large-scale machine learning on heterogeneous systems," arXIvl603.04467v2 Mar. 16, 2016, 19 pages.

Bahdanau et al. "Neural machine translation by jointly learning to align and translate," arXiv 1409.0473, Sep. 1, 2014, 15 pages.

Bui et al. "Neural graph machines: Learning neural networks using graphs," arXiv 1703.04818, Mar. 14, 2017, 9 pages.

Byrne, F., "Encoding reality: Prediction-assisted cortical learning algorithm in hierarchical temporal memory," arXiv preprint arXiv:1509.08255. (Year: 2015).

Charikar. "Similarity estimation techniques from rounding algorithms," Proceedings of the Thirty-fourth Annual ACM Symposium on Theory of Computing, May 19, 2002, 9 pages.

Chen et al. "Compressing neural networks with the hashing trick," Proceedings of the 32$^{nd}$ International Conference on International Conference on Machine Learning, Jun. 1, 2015, 10 pages.

Cheng, L., Hou, Z. G., Honnnna, N., Tan, M., & Gupta, M. M. (Jun. 2009). Solving convex optimization problems using recurrent neural networks in finite time. In 2009 International Joint Conference on Neural Networks (pp. 538-543). IEEE. (Year: 2009).

Chun et al. "Augmented smartphone applications through clone cloud execution," Proceedings of the 12$^{th}$ Conference on Hot Topics in Operating Systems, May 18, 2009, 11 pages.

Courbariaux et al. "Binarynet: Training deep neural networks with weights and activations contrained to +1 or −1," arXiv 1602.02830v1, Feb. 9, 2016, 9 pages.

Courbariaux et al. "Low precision arithmetic for deep learning," arXiv1412.7024v1, Dec. 2014, 9 pages.

Dahl, G. E. et al., "Large-scale malware classification using random projections and neural networks," In 2013 IEEE International Conference on Acoustics, Speech and Signal Processing (pp. 3422-3426). IEEE, May 2013.

Denil et al. "Predicting parameters in deep learning," Proceedings of the 26$^{th}$ International Conference on Neural Information Processing Systems, Dec. 2013, 9 pages.

EP Communication pursuant to Article 94(3) EPC in European Appln No. 18729286.7, dated Feb. 4, 2020, 13 pages.

Fahkr et al., "Siamese-twin random projection neural network with Bagging Trees tuning for unsupervised binary image hashing." 2017 5th International Symposium on Computational and Business Intelligence (ISCBI). IEEE, 2017.

Ganchev et al. "Small Statistical Models by Random Feature Mixing," Proceedings of the ACL-08: HLT Workshop on Mobile Language Processing, Jun. 2008, 2 pages.

Gong et al. "Compressing deep convolutional networks using vector quantization," arXiv 1412.6115, Dec. 18, 2014, 10 pages.

Goodfellow et al. "Generative Adversarial Networks," Advances in Neural Information Processing Systems, Jun. 2014, 9 pages.

Hinton et al. "Deep Neural networks for acoustic modeling in speech recognition: the shared views of four research groups," IEEE Signal Processing Magazine, vol. 29(6), Nov. 2012, 16 pages.

Hinton et al. "Distilling the Knowledge in a Neural Network," arXiv 1503.02531v1, Mar. 9, 2015, 9 pages.

IE Search Report issued in Irish Application No. 2018/0149, dated Sep. 5, 2018, 10 pages.

Kaban, A. "Improved bounds on the dot product under random projection and random sign projection," In Proceedings of the 21th ACM SIGKDD International Conference on Knowledge Discovery and Data Mining (pp. 487-496). ACM. (Aug. 2015).

Kannan et al. "Smart reply: Automated response suggestion for email," Proceedings of the ACM SIGKDD Conference on Knowledge Discovery and Data Mining (KDD), Aug. 2016, 10 pages.

Konecny et al. "Federated optimization: Distributed machine learning for on-device intelligence," arXiv1610.02527v1, Oct. 8, 2016, 38 pages.

Krizhevsky et al. "Imagenet classification with deep convolutional neural networks," Advances in Neural Information Processing Systems, Dec. 2012, 9 pages.

Lee et al. "A low-power processor with configurable embedded machine-learning accelerators for high-order and adaptive analysis of medical-sensor signals," IEEE Journal of Solid-State Circuits, vol. 48, Jul. 2013, 13 pages.

Mikolov et al. "Efficient estimation of word representations in vector space," arXiv 1301.3781v3, Sep. 7, 2013, 12 pages.

Nair et al. "Rectified linear units improve restricted boltzman machines," Proceedings of the 27$^{th}$ International Conference on Machine Learning, Jun. 2010, 8 pages.

Neumann et al., "Regularization by intrinsic plasticity and its synergies with recurrence for random projection methods," Journal of Intelligent Learning Systems and Applications, 4(3). (Year: 2012).

PCT International Preliminary Report on Patentability issued in International Application No. PCT/US2018/033378, dated Nov. 26, 2019, 13 pages.

PCT International Search Report and Written Opinion issued in International Application No. PCT/US2018/033378, dated Jul. 24, 2018, 20 pages.

Quora.com [online], "What is signum function, what is its used in machine learning neural networks?," Feb. 5, 2017, retrieved on Feb.

(56) References Cited

OTHER PUBLICATIONS 26, 2020, retrieved from URL <https://www.quora.com/What-is-signum-function-what-is-its-uses-in-machine-learning-neural-networks>, 3 pages.
Ravi et al. "Large scale distributed semi-supervised learning using streaming approximation," Proceedings of the 19$^{th}$ International Conference on Artificial Intelligence and Statistics, May 2, 2016, 10 pages.
Schuster. "Speech recognition for mobile devices at google," Proceedings of the 11$^{th}$ Pacific Rim International Conference on Trends in Artificial Intelligence, Aug. 30, 2010, 3 pages.
SG Search Report and Written Opinion in Singapore Appln. No. 10201804213U, dated Dec. 31, 2019, 10 pages.
SG Written Opinion in Singaporean Application No. 10201804213U, dated Jun. 19, 2020, 6 pages.
Shi et al. "Hash kernels for structured data," Journal of Machine Learning Res. vol. 10, Nov. 2009, 23 pages.
Srivastava et al. "Dropout: a simple way to prevent neural networks from overfitting," Journal of Machine Learning Research, vol. 15, Jan. 2014, 30 pages.
Stolcke. "Entropy-based pruning of backoff language models," arXiv cs/0006025v1, Jun. 11, 2000, 5 pages.
Sutskever et al. "Sequence to sequence learning with neural networks," Advances in Neural Information Processing Systems, Dec. 2014, 9 pages.
Theiler et al, "Sparse matrix transform for fast projection to reduced dimension," 2010 IEEE International Geoscience and Remote Sensing Symposium, Jul. 2010, 4362-4365.
Wang et al. "Learning to hash for indexing big data—a survey," arXiv 1509.05472v1, Sep. 17, 2015, 22 pages.
Weinberger et al. "Feature hashing for large scale multitask learning," arXiv 0902.2206v5, Feb. 27, 2010, 10 pages.
Wilensky, G. D. et al., "The projection neural network," In [Proceedings 1992] IJCNN International Joint Conference on Neural Networks (vol. 2, pp. 358-367). IEEE, Jun. 1992.
Wojcik et al., Training neural networks on high-dimensional data using random projection. Pattern Analysis and Applications, 1-11. (Year: 2018).
Yang et al. "Revisiting semi-supervised learning with graph embeddings," Proceedings of the 33$^{rd}$ International conference on Machine Learning, Jun. 2016, 9 pages.
Zhu, S., Kang, B. N., & Kim, D. (Oct. 2016). A deep neural network based hashing for efficient image retrieval. In 2016 IEEE International Conference on Systems, Man, and Cybernetics (SMC) (pp. 002483-002488). IEEE. (Year: 2016).
CN Office Action in Chinese Appln. No. 201880033479.5, dated Sep. 28, 2022, 21 pages (with English Translation).

* cited by examiner

PROJECTION NEURAL NETWORKS

CROSS-REFERENCE TO RELATED APPLICATIONS

This patent application is a continuation (and claims the benefit of priority under 35 USC 120) of U.S. patent application Ser. No. 15/983,441, filed May 18, 2018, which claims the benefit under 35 U.S.C. § 119(e) of U.S. Patent Application No. 62/517,635, filed Jun. 9, 2017, and U.S. Patent Application No. 62/509,058, filed May 20, 2017. The disclosure of the foregoing applications are incorporated herein by reference in its entirety for all purposes.

BACKGROUND

This specification relates to projection neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a projection neural network implemented as computer programs on one or more computers in one or more locations.

According to a first aspect there is provided a system including one or more computers and one or more storage devices storing instructions that when executed by the one or more computers cause the one or more computers to implement a projection neural network. The projection neural network is configured to receive a projection network input and to generate a projection network output from the projection network input. The projection neural network includes a sequence of one or more projection layers, wherein each projection layer has multiple projection layer parameters. Each projection layer is configured to receive a layer input and apply multiple projection layer functions to the layer input. Each projection layer function generates a respective projection function output that projects the layer input to a different space. Each projection layer generates a layer output by applying the projection layer parameters for the projection layer to the projection function outputs.

In some implementations, the projection neural network further includes an output layer configured to receive a layer output generated by a highest projection layer in the sequence and to generate the projection network output.

In some implementations, the output layer is a softmax output layer.

In some implementations, the projection neural network includes only the sequence of projection layers and the output layer.

In some implementations, a layer output of the highest projection layer in the sequence is the projection network output.

In some implementations, the projection neural network includes only the sequence of projection layers.

In some implementations, the layer input of a lowest projection layer in the sequence is a network input to the projection neural network.

In some implementations, the layer input of any projection layer other than the lowest projection layer is a layer output generated by the projection layer immediately below the projection layer in the sequence.

In some implementations, for each projection layer, each projection function is associated with a respective set of projection vectors. Applying each projection function to the layer input includes, for each projection vector: (i) determining a dot product between the layer input and the projection vector, (ii) when the dot product is negative, assigning a first value to a corresponding position in the projection function output, and (iii) when the dot product is positive, assigning a second value to the corresponding position in the projection function output.

In some implementations, for each projection layer, the projection functions are each encoded as sparse matrices and are used to generate a binary representation from the layer input.

In some implementations, the projection layer parameters include a parameter matrix and a bias vector. Generating the layer output by applying the projection layer parameters for the projection layer to the projection function outputs includes applying the parameter matrix to the projection function outputs and then adding the bias vector to the result.

According to a second aspect there is provided a method of training the projection neural network. The method includes receiving a training input and a target output for the training input. The training input is processed using the projection neural network in accordance with current values of the projection layer parameters to generate a projection network output for the training input. The training input is processed using a trainer neural network having multiple trainer neural network parameters. The trainer neural network is configured to process the training input in accordance with current values of the trainer neural network parameters to generate a trainer network output that is specific to the particular machine learning task. A gradient is determined with respect to the trainer neural network parameters of a loss function that depends on an error between the target output and the trainer network output. A gradient is determined with respect to the projection layer parameters of a loss function that depends on an error between the trainer network output and the projection network output. Updates to the current values of the trainer network parameters and the projection layer parameters are determined using the gradients.

In some implementations, the output generated by the trainer neural network is a soft target output.

In some implementations, the method further includes determining a gradient with respect to the trainer network parameters of the loss function that depends on the error between the trainer network output and the projection network output. The update to the current values of the trainer network parameters is also based on the gradient with respect to the trainer network parameters of the loss function that depends on the error between the trainer network output and the projection network output.

In some implementations, the method further includes determining a gradient with respect to the projection layer parameters of a loss function that depends on an error between the target output and the projection network output. The update to the current values of the projection layer parameters is also based on the gradient with respect to the projection layer parameters of the loss function that depends on the error between the target output and the projection network output.

According to a third aspect there is provided a system including one or more computers and one or more storage devices storing instructions that when executed by the one or more computers cause the one or more computers to perform the operations of the previously described method.

According to a fourth aspect there is provided one or more computer storage media storing instructions that when executed by one or more computers cause the one or more computers to perform the operations of the previously described method.

According to a fifth aspect there is provided one or more computer storage media storing instructions that when executed by one or more computers cause the one or more computers to implement the previously described projection neural network.

Particular embodiments of the subject matter described in this specification can be implemented so as to realize one or more of the following advantages.

A projection network as described in this specification can perform tasks faster and with a performance level (e.g., a prediction accuracy) that is similar to that of much larger and more complex conventional neural networks (i.e., neural networks that do not contain projection layers, as described in this specification), while consuming fewer computational resources (e.g., memory and computing power). For example, in some cases, a projection network can perform tasks (e.g., image classification) with a performance level comparable to that of a larger neural network, despite the projection network having several orders of magnitude fewer parameters than the larger neural network. Projection networks can perform tasks faster and consume fewer computational resources than conventional neural networks because they include projection layers.

A projection layer reduces the dimensionality of a projection layer input by processing the projection layer input by projection layer functions. The projection layer functions generate projection function outputs that have a dimensionality that may be several orders of magnitude smaller than the dimensionality of the projection layer input. The projection layer generates a projection layer output by applying projection layer parameters (e.g., a weight matrix and a bias vector) to the low-dimensional projection function outputs. In contrast, a conventional neural network layer (e.g., a conventional fully-connected layer) may directly process a (high-dimensional) conventional layer input without first reducing the dimensionality of the conventional layer input. Since projection layers reduce the dimensionality of layer inputs by projection functions, projection layers may require far fewer layer parameters and may perform far fewer arithmetic operations in generating layer outputs than some conventional neural network layers.

Therefore, projection layers can reduce computational resource consumption (e.g., relative to conventional neural network layers) by performing fewer arithmetic operations and therefore consuming less computing power. Moreover, projection layers can reduce computational resource consumption since they can be stored (e.g., in a logical data storage area or physical data storage device) using less memory (e.g., as measured in bytes).

Consequently, projection networks may be suitable for deployment in resource-constrained systems, such as mobile device environments (e.g., smartphones and smartwatches), where some conventional neural networks cannot be deployed (e.g., because their computational resource demands exceed the computational resources available). Moreover, deploying projection networks to resource constrained systems enables these systems to increase data privacy by performing tasks locally instead of remotely. Performing a task locally refers to performing the task using computational resources located within the system, whereas performing a task remotely refers to transmitting data characterizing the task to a remote environment (e.g., a cloud environment) over a communications network (e.g., the Internet), and receiving the results of the completed task back over the communications network. Performing tasks locally can increase data privacy since it does not require transmitting data over communications networks.

A projection network can be trained to achieve a performance level (e.g., prediction accuracy) comparable to that of a much larger neural network by jointly training the projection network and a trainer network. A trainer network is a network that is configured to perform the same task as the projection network, but which is generally much larger (i.e., has more parameters) than the projection network. The values of the projection network parameters may be iteratively updated during training using a gradient of a loss function that depends on an error between the trainer network output and the projection network output. In this manner, the projection network can learn to mimic the predictions of the trainer network and thereby generate predictions that are nearly as accurate as those of the trainer network, despite the projection network having far fewer parameters than the trainer network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
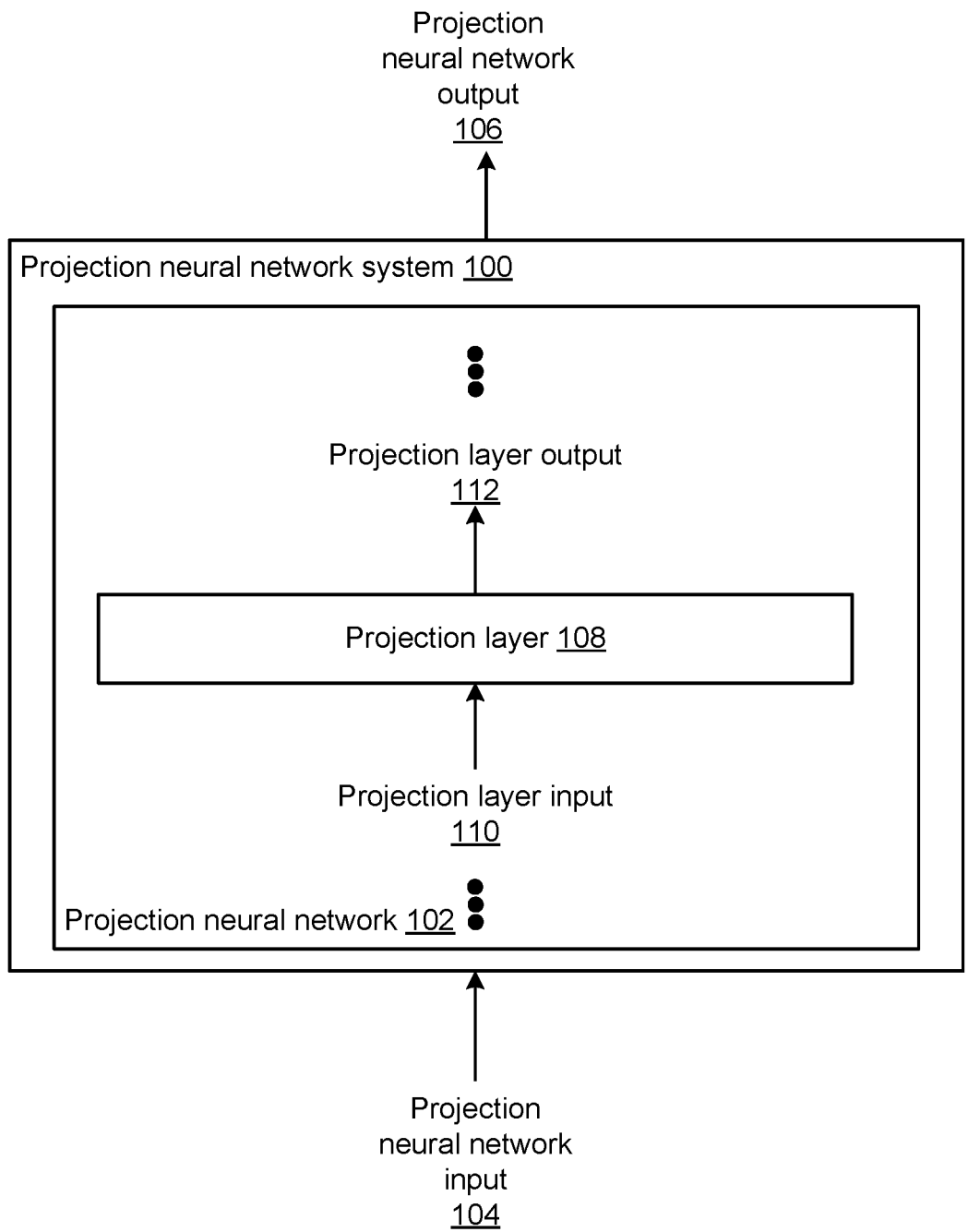
FIG. 1 shows an example projection neural network system.

FIG. 1 shows an example projection neural network system 100. The projection neural network system 100 is an example of a system implemented as computer programs on one or more computers in one or more locations in which the systems, components, and techniques described below are implemented.

The projection neural network system 100 includes a projection neural network 102. The projection neural network 102 can be a feed-forward neural network, a recurrent neural network, or any other appropriate type of neural network.

The projection neural network 102 is configured to receive a projection neural network input 104 and to generate a projection network output 106 from the projection network input 104. The projection neural network input 104 can be any kind of digital data input, and the projection network output 106 can be any kind of score, classification, or regression output based on the input.

The system 100 described herein is widely applicable and is not limited to one specific implementation. However, for illustrative purposes, a small number of example implementations are described below.

For example, if the inputs to the projection neural network 102 are images or features that have been extracted from images, the output generated by the projection neural network 102 for a given image may be scores for each of a set of object categories, with each score representing an estimated likelihood that the image contains an image of an object belonging to the category.

As another example, if the input to the projection neural network 102 is a sequence of text in one language, the output generated by the projection neural network 102 may be a score for each of a set of pieces of text in another language, with each score representing an estimated likelihood that the piece of text in the other language is a proper translation of the input text into the other language.

As another example, if the input to the projection neural network 102 is a sequence representing a spoken utterance, the output generated by the projection neural network 102 may be a score for each of a set of pieces of text, each score representing an estimated likelihood that the piece of text is the correct transcript for the utterance.

As another example, if the input to the projection neural network 102 is a sequence of physiological measurements, the output generated by the projection neural network 102 may be a score for each of a set of possible diagnoses for the condition of a user, with the score representing an estimated likelihood that the diagnosis is accurate.

As another example, if the input to the projection neural network 102 is a sequence of text from a received communication, the output generated by the projection neural network 102 may be a score for each of a set of possible responses to the received communication, with the score representing an estimated likelihood that the response matches a user's intent.

The projection neural network 102 includes a sequence of one or more projection layers (e.g., the projection layer 108), and may optionally include one or more conventional neural network layers (e.g., fully-connected layers, convolutional layers, or softmax layers).

As will be described further with reference to FIG. 2, the projection layer 108 is configured to receive a projection layer input 110, and to process the projection layer input 110 in accordance with current values of projection layer parameters to generate a projection layer output 112. In general, the projection layer input 110 may be the projection network input 104 (i.e., if the projection layer 108 is the first layer in the projection network 102) or the output of another layer of the projection network 102 (e.g., a conventional layer or another projection layer). The projection layer input 110 and the projection layer output 112 may be represented in any appropriate numerical format, for example, as vectors or as matrices.

A layer of the projection network 102 is referred to as an output layer if the output of the layer is included in the projection network output 106. An output layer may be a softmax layer, a projection layer, or any other appropriate neural network layer. The output layer may be configured to receive as input an output generated by a projection layer or a conventional layer.

The system 100 can be implemented in a resource-constrained environment (e.g., a smartwatch or smartphone) more readily than conventional neural network systems. For example, by including projection layers (e.g., the projection layer 108) in place of conventional neural network layers (e.g., fully-connected layers), data defining the parameters of the system 100 can occupy much less storage capacity than data defining the parameters of a conventional neural network system.

Figure 2:
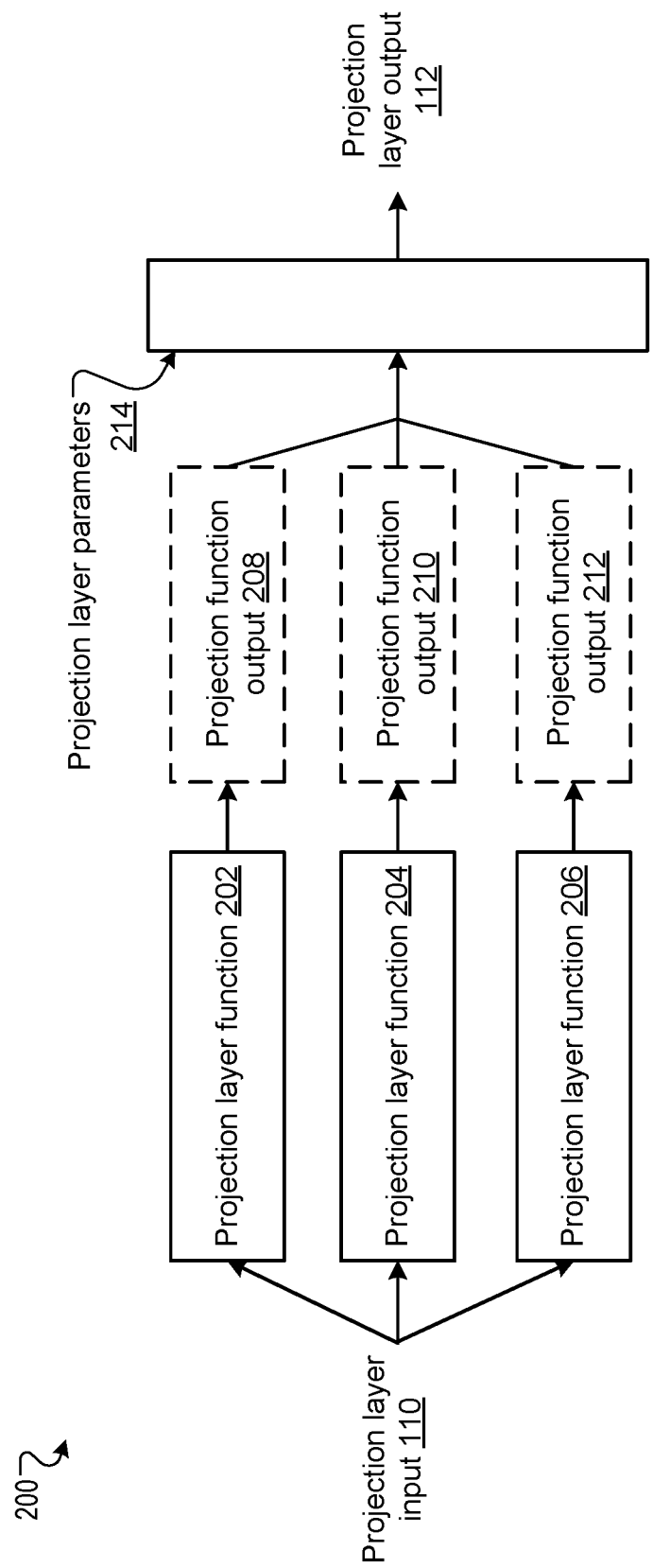
FIG. 2 is a block diagram of an example data flow for processing a projection layer input to determine a projection layer output.

FIG. 2 is a block diagram of an example data flow 200 by which a projection layer (e.g., the projection layer 108) can process a projection layer input 110 to determine a projection layer output 112. The projection layer provides the projection layer input 110 to each of one or more projection layer functions (e.g., 202, 204, 206). Each of the projection layer functions processes the projection layer input 110 to generate a respective projection function output (e.g., 208, 210, 212). Generally, the dimensionality of the projection function outputs are much less (e.g., by several orders of magnitude) than the dimensionality of the projection layer input 110. The projection layer concatenates the projection function outputs and applies the projection layer parameters 214 (e.g., a parameter matrix and a bias vector) to the concatenated projection function outputs. Generating a projection layer output 112 by processing a projection layer input 110 is described further with reference to FIG. 4.

This specification describes the operations performed by a projection layer (e.g., as described with reference to FIG. 2 and FIG. 4) in the context of a projection neural network (e.g., as described with reference to FIG. 1). More generally, other systems, such as graph-based systems, can incorporate the operations performed by a projection layer. A graph is a data structure that may be represented by a set of nodes (where each node may be associated with a numerical feature vector), a set of edges (where each edge may be associated with a numerical edge strength value), and in some cases, a set of labels. The nodes represent entities (e.g., people, objects, locations, or concepts), the edges represent relationships between the entities represented by the nodes (e.g., a "friend" relationship between two people in a social network), and in some cases, the labels may represent characteristics of the nodes (e.g., whether a product represented by a node is a "best-selling" product).

Graph-based systems can be trained by machine learning techniques (e.g., supervised or semi-supervised machine learning techniques) to make predictions. For example, a graph-based system may generate a prediction for a value of a label associated with a previously unlabeled node in a graph. In this example, the graph-based system may generate a prediction for a value of a label associated with a given node based on the labels of the neighboring nodes (i.e., nodes that are connected to the given node by an edge) and the edge strengths of the edges connecting the given node to the neighboring nodes.

A graph-based system can incorporate the operations performed by a projection layer by, for example, generating a projection graph that is a compact representation of a trainer graph. Each node of the projection graph may correspond to a different node of the trainer graph, and the feature vectors associated with the nodes of the projection graph may be determined by performing projection layer operations. More specifically, the feature vector associated with a particular node of the projection graph may be determined by applying multiple projection functions followed by a transformation (e.g., defined by a parameter matrix and a bias vector) to the feature vector associated with the corresponding node in the trainer graph. In this manner, the feature vectors associated with the nodes of the projection graph may have a much smaller dimensionality than the feature vectors associated with the nodes of the trainer graph. Therefore, similar to a projection neural network, the projection graph may be suitable for deployment to resource constrained environments (e.g., mobile devices) where the trainer graph could not be deployed.

Figure 3:
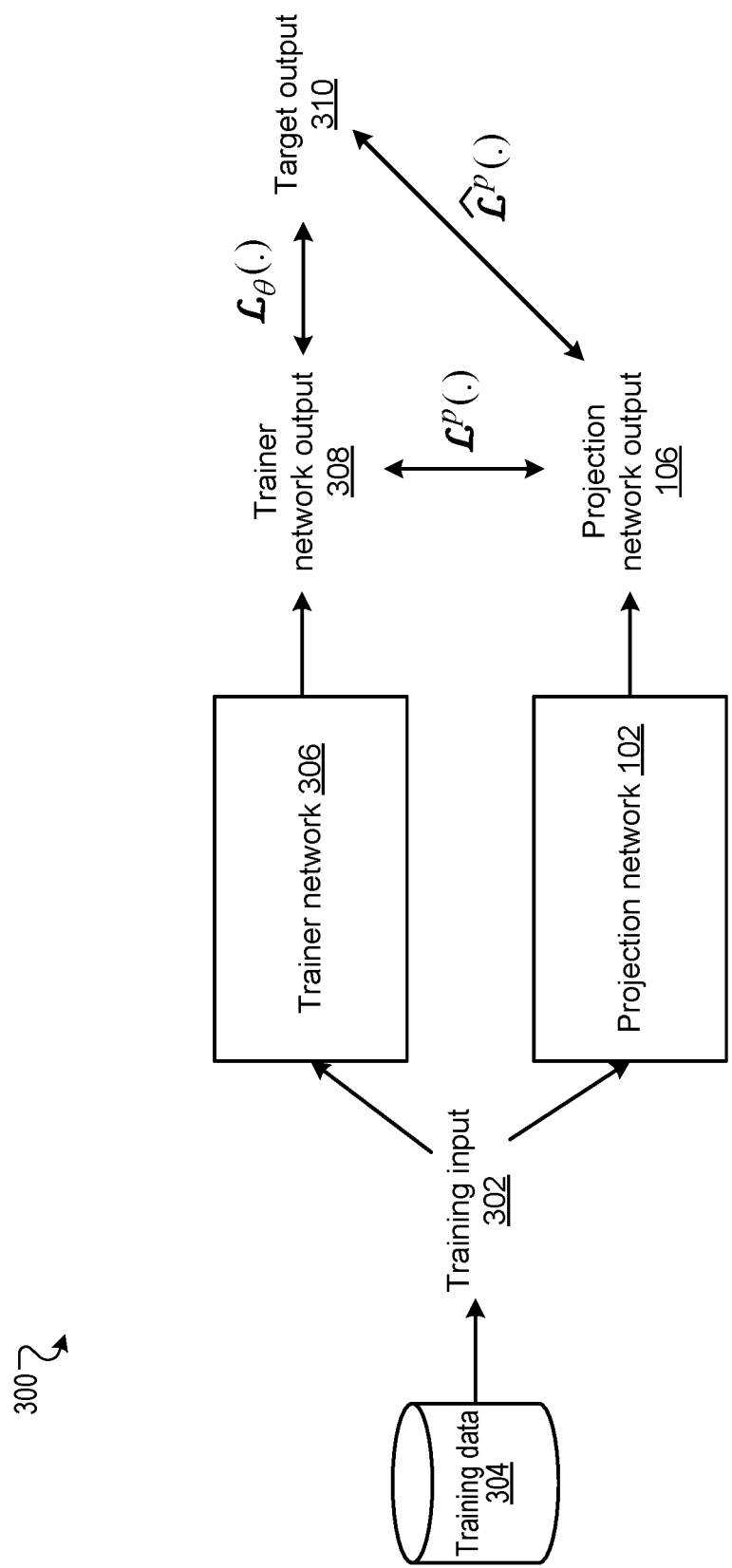
FIG. 3 is a block diagram of an example data flow for training a projection neural network.

FIG. 3 is a block diagram of an example data flow 300 by which a projection neural network system (e.g., the projection neural network system 100) can train a projection neural network (e.g., the projection neural network 102).

As part of the training, the system provides a training input 302 from a set of training data 304 to the projection network 102. The projection network 102 processes the training input 302 in accordance with current values of projection network parameters to generate a projection network output 106. The system provides the same training input 302 to a trainer network 306. The trainer network 306 processes the training input 302 in accordance with current values of trainer network parameters to generate a trainer network output 308. The trainer network 306 can be a feed-forward neural network, a recurrent neural network, or any other appropriate type of neural network that is configured to generate the same kinds of outputs as the projection network 102 given the same training input. In general, the trainer network 306 has more parameters (in some cases, by several orders of magnitude) than the projection network 102.

The system jointly updates the current values of the projection network parameters and the trainer network parameters by computing gradients (e.g., by a backpropagation procedure) of a combination of several different loss functions. The loss functions can depend on the projection network output 106, the trainer network output 308, or both.

For example, the system can update the current values of the trainer network parameters by a gradient of a loss function $\mathcal{L}_\theta$ (referred to as a trainer prediction loss function) that depends on an error between the trainer network output 308 and the target output 310 associated with the training input 302 in the training data 304. The target output 310 is an output that should be generated by the trainer neural network 306 and the projection network 102 in response to processing the training input 302. Updating the current values of the trainer network parameters by the gradient of the trainer prediction loss function $\mathcal{L}_\theta$ can cause the trainer network 306 to generate an output that is more similar to target output 310 (i.e., in response to processing the training input 302).

As another example, the system can update the current values of the projection network parameters by a gradient of a loss function $\hat{\mathcal{L}}^p$ (referred to as a projection prediction loss function) that depends on an error between the projection network output 106 and the target output 310. Updating the current values of the projection network parameters by the gradient of the projection prediction loss function $\hat{\mathcal{L}}^p$ can cause the projection network 102 to generate an output that is more similar to the target output 310 (i.e., in response to processing the training input 302).

As another example, the system can also update the current values of the projection network parameters (and, optionally, the trainer network parameters) by a gradient of a loss function $\mathcal{L}^p$ (referred to as a projection simulation loss function) that depends on an error between the trainer network output 308 and the projection network output 106. Updating the current values of the projection network parameters by the gradient of the projection simulation loss function $\mathcal{L}^p$ can cause the projection network 102 to generate an output that is more similar to the trainer network output 308. By updating the values of the projection network parameters based on the projection simulation loss function $\mathcal{L}^p$, the system can (in some cases) enable the projection network 102 to generate predictions that are similar in accuracy to the predictions generated by the trainer network 306, despite the projection network 102 having far fewer parameters (e.g., in some cases, by several orders of magnitude) than the trainer network 306.

Generally, the trainer prediction loss function $\mathcal{L}_\theta$, the projection prediction loss function $\hat{\mathcal{L}}^p$, and the projection simulation loss function $\mathcal{L}^p$ can be any appropriate loss functions. For example, if the trainer network 306 and the projection network 102 perform classification tasks, then the loss functions may be cross-entropy loss functions. As another example, if the trainer network 306 and the projection network 102 perform regression tasks, then the loss functions may be squared-error loss functions. The system may adjust the parameters of the projection network 102 and the trainer network 306 by a weighted combination of gradients of each of the described loss functions.

A graph-based system, as described earlier, that generates a projection graph as a compact representation of a trainer graph, can jointly train the projection graph, the trainer graph, and the parameters of the projection layer operations used to determine the projection graph from the trainer graph. In a particular example, the parameters of the projection layer operations can be trained (e.g., by a backpropagation procedure) to cause the predictions generated by the graph-based system based on the projection graph to become more similar to the predictions generated by the graph-based system based on the trainer graph. The similarity between predictions may be measured by a loss function, such as a cross-entropy loss function. The predictions generated by the graph-based system based on the projection graph and the trainer graph may be predicted labels for labeled or unlabeled nodes in the projection graph and trainer graph respectively.

Figure 4:
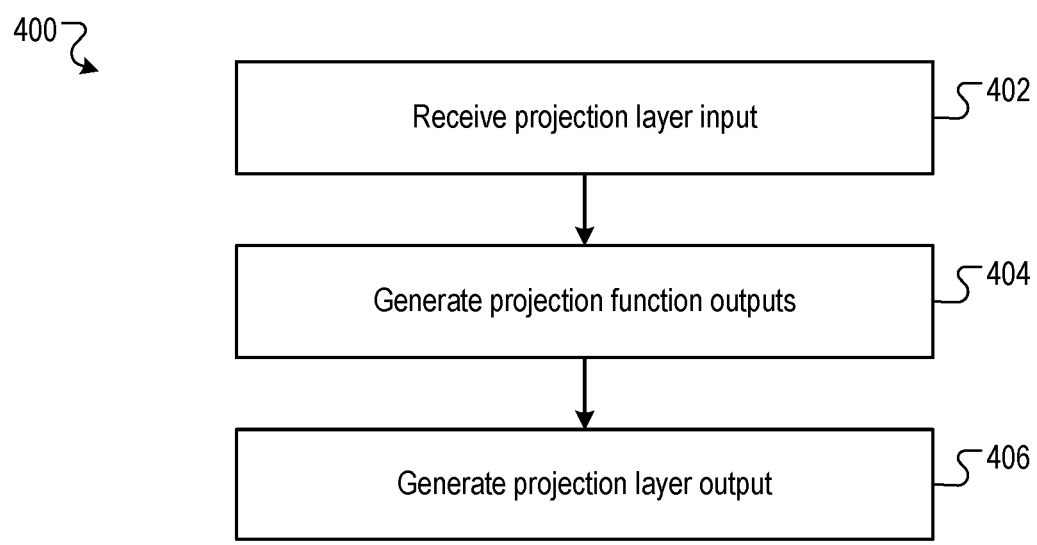
FIG. 4 is a flow diagram of an example process for generating a projection layer output.

FIG. 4 is a flow diagram of an example process for generating a projection layer output. For convenience, the process 400 will be described as being performed by a projection layer, implemented by one or more computers located in one or more locations. For example, a projection layer, e.g., the projection layer 108 of FIG. 1, appropriately programmed in accordance with this specification, can perform the process 400.

The projection layer receives a projection layer input (402). As described earlier, the projection layer input may be the projection network input or the output of another layer of the projection network, and may be represented in any appropriate numerical format (e.g., as a vector or as a matrix).

The projection layer provides the projection layer input to each of one or more projection functions, each of which are configured to process the projection layer input to generate a respective projection function output (404). Each projection function generates a corresponding projection function output by mapping the projection layer input to a different space. More specifically, the projection function outputs may belong to a much lower-dimensional space than the projection layer input. For example, in some cases, the projection function outputs may have a dimensionality that is several orders of magnitude lower than the dimensionality of the projection layer input.

Generally, each projection function may be defined by a matrix. The rows (or columns) of a matrix defining a projection function are referred to as projection vectors associated with the projection function. In some cases, a projection function may process the projection layer input by determining dot products (i.e., inner products) between the projection layer input and each of the projection vectors associated with the projection function. For example, for a projection function $\mathbb{P}$, the projection function output $\mathbb{P}(x)$ for projection layer input x (that is represented as a vector) may be determined as:

$$\mathbb{P}(x) = [\langle x, P_1 \rangle, \langle x, P_2 \rangle, \ldots, \langle x, P_n \rangle] \quad (1)$$

where $\langle \cdot, \cdot \rangle$ denotes the dot product operation between vectors, and $\{P_i\}_{i=1}^n$ are the projection vectors associated with the projection function $\mathbb{P}$.

In some cases, a projection function may process the projection layer input by determining whether the dot product between the projection layer input and each of the projection vectors results in positive or negative values. When a dot product between the projection layer input and a projection vector results in a positive value, a first value may be assigned to a corresponding position in the projection function output. Conversely, when a dot product between the projection layer input and a projection vector results in a negative value, a second value may be assigned to a corresponding position in the projection function output. For example, the projection function output $\mathbb{P}(x)$ for projection layer input x (that is represented as a vector) may be determined as:

$$\mathbb{P}(x) = [\text{sgn}(\langle x, P_1 \rangle), \text{sgn}(\langle x, P_2 \rangle), \ldots, \text{sgn}(\langle x, P_n \rangle)] \quad (2)$$

where sgn($\cdot$) is the sign function, which outputs value 1 in response to receiving a positive input, and outputs value 0 in response to receiving a negative input. In this example, the projection function output is a binary representation (i.e., a vector with components consisting of 0s and 1s) of the projection layer input. By representing the projection function outputs as binary representations, the memory footprint of the projection network (i.e., the quantity of memory required to store and use the projection network) can be significantly reduced compared to conventional networks (i.e., where layer outputs are represented as real number representations instead of binary representations).

The projection functions may be locality sensitive hashing functions. Generally, a locality sensitive hashing function maps similar inputs to similar outputs. More specifically, a locality sensitive hashing function may be defined as a function $\mathbb{P}$ so that if a similarity between inputs $x_1$ and $x_2$ is defined by a mapping $\phi(x_1, x_2)$ (e.g., a cosine similarity mapping) whose output value is between 0 and 1, then the probability that $\mathbb{P}(x_1) = \mathbb{P}(x_2)$ is equal to $\phi(x_1, x_2)$. In some cases, the projection function defined by (2) may be an example of a locality sensitive hashing function.

Projection functions may be selected so that: (i) processing a projection layer input by a projection function to generate a projection function output is computationally efficient (e.g., requires few arithmetic operations), (ii) data defining a projection function can be efficiently stored (e.g., in a logical data storage area or physical data storage device), or both.

For example, one or more of the projection functions may be defined by sparse matrices (i.e., matrices with only a few non-zero entries). If a projection function is defined by a sparse matrix, then processing the projection layer input by the projection function to generate the projection function output is computationally efficient. Specifically, since the results of many of the arithmetic operations involved in computing the projection function output have value zero (due to the sparsity of the matrix defining the projection function), these arithmetic operations do not actually need to be performed.

Moreover, if a projection function is defined by a sparse matrix, then the data defining the projection function can be efficiently stored. For example, a sparse matrix may be stored as a list of tuples, where each tuple includes an index of a location in the sparse matrix and a corresponding value of the sparse matrix at the index. Since sparse matrices have only a few non-zero entries, such a representation occupies less memory than, for example, a representation of a dense matrix that must include the index of every location in the dense matrix and the corresponding value of the dense matrix at the index.

As another example, the system may determine the values of the components of the matrices defining one or more of the projection functions based on the values of a set of seed parameters. The seed parameters are represented as numerical values and the number of seed parameters is typically much smaller than the dimensionality of the matrices defining the projection functions. The system may, for example, determine the values of the components of the matrices defining the projection functions based on the outputs of random (or pseudo-random) number generators that are initialized using the seed parameters. In this example, when the random (or pseudo-random) number generators are configured to generate Normally-distributed random numbers (i.e., random numbers drawn from a Normal distribution), the values of the components of the matrices defining the projection functions are approximately Normally-distributed.

By using seed parameters to determine the values of the components of the matrices defining the projection functions, the system can reduce the computational requirements of projection layers compared to conventional layers. For example, the system can reduce the amount of memory storage required for projection layers compared to conventional layers, since only the values of the seed parameters must be stored, as compared to some conventional layers that require storing entire dense matrices of conventional layer parameter values. As another example, the system can reduce the latency in generating layer outputs compared to conventional layers, since the system can dynamically compute the values of the components of the matrices defining the projection functions. In contrast, for some conventional layers, the system reads the conventional layer parameter values from memory, which may be a substantially slower process than dynamically computing these values (i.e., as in a projection layer).

The values of the parameters defining the projection layer functions (e.g., the seed parameters or the values of the components of the projection vectors) may be predetermined, that is, may be fixed before the projection network is trained, and are not adjusted during training.

The projection layer generates the projection layer output by applying projection layer parameters to the projection function outputs (406). For example, the projection layer parameters may include a parameter matrix and a bias vector, and the projection layer may generate the projection layer output y as:

$$y = W \cdot x + b \quad (3)$$

where W is the parameter matrix (i.e., so that W·x represents a matrix-vector multiplication), b is the bias vector, and x is the concatenation of the projection function outputs.

As described earlier, the dimensionality of the projection function outputs is generally much lower than the dimensionality of the projection layer input. Therefore, the number of projection layer parameters that are applied to the projection function outputs to generate the projection layer outputs is generally much lower than the number of parameters that are applied to layer inputs by conventional neural network layers (e.g., fully-connected layers) that do not include projection functions. For example, the dimensionality of the projection layer parameters defined by the parameter matrix W and the bias vector b in the projection layer may be much smaller than the dimensionality of the corresponding layer parameters of a conventional neural network layer.

Figure 5:
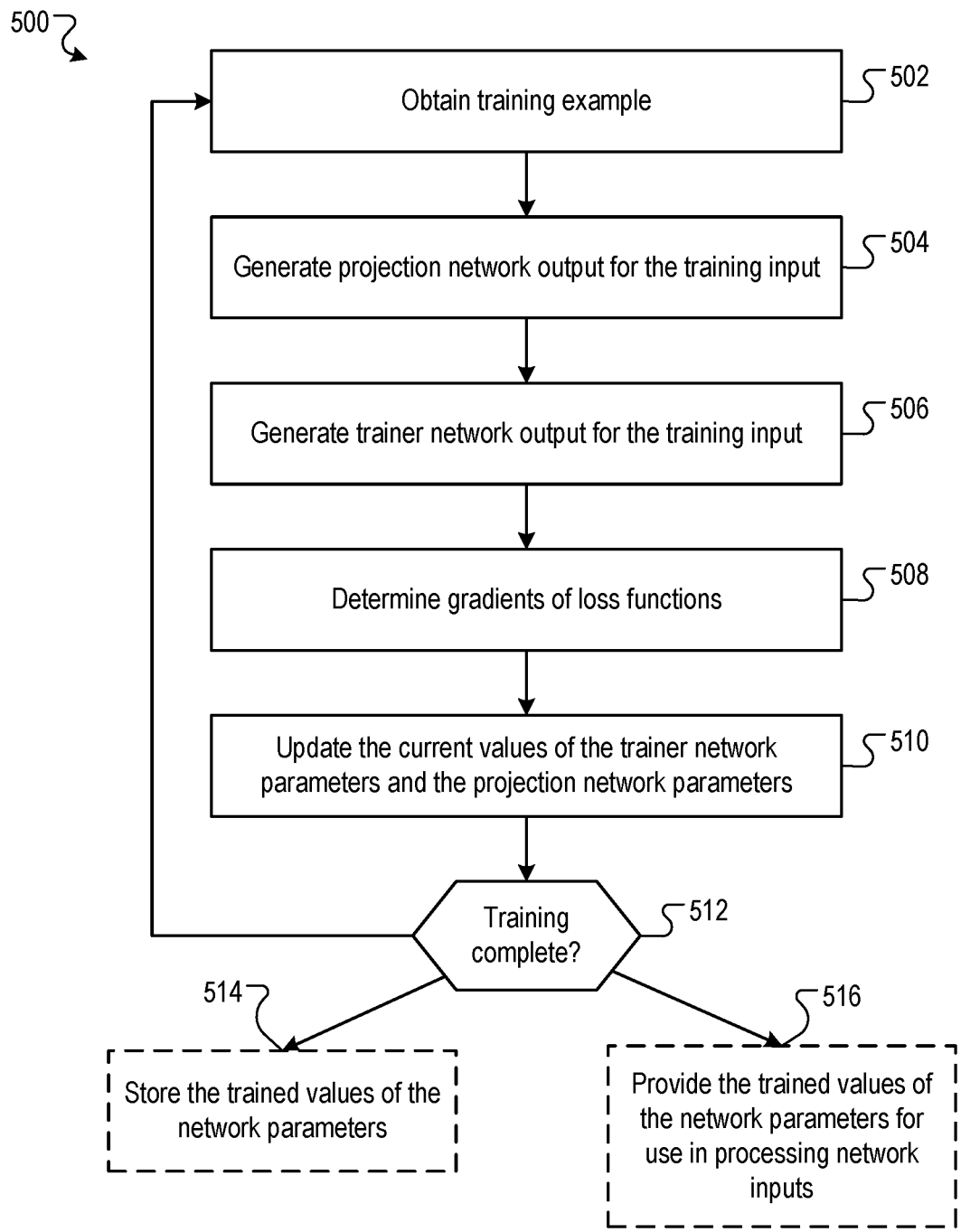
FIG. 5 is a flow diagram of an example process for jointly training a projection neural network and a trainer neural network.

FIG. 5 is a flow diagram of an example process for jointly training a projection neural network and a trainer neural network. For convenience, the process 500 will be described as being performed by a system of one or more computers located in one or more locations. For example, a projection neural network system, e.g., the projection neural network system 100 of FIG. 1, appropriately programmed in accordance with this specification, can perform the process 500.

The system obtains a training example, including a training input and a corresponding target output (i.e., the output that should be produced in response to processing the training input), from a set of training data (502). For example, the system may randomly sample a training example from the set of training data. In general, the system may obtain a batch of multiple training examples from the training data (rather than a single training example). In this case, the system may perform the steps 504, 506, and 508 for each training example from the batch, before updating the current values of the trainer network parameters and the projection network parameters (as described with reference to 510).

The system provides the training input to the projection network, which processes the training input in accordance with current values of projection network parameters to generate a projection network output for the training input (504). More specifically, each layer of the projection network (including the projection layers and, in some cases, one or more conventional layers) processes a respective layer input in accordance with current values of layer parameters to generate a corresponding layer output.

The system provides the training input to a trainer network, which processes the training input in accordance with current values of trainer network parameters to generate a trainer network output for the training input (506). The trainer network can be a feed-forward neural network, a recurrent neural network, or any other appropriate type of neural network. In general, the trainer network has more parameters than the projection network (e.g., by having more layers, larger layers, or both). Each layer of the trainer network processes a respective layer input in accordance with current values of layer parameters to generate a corresponding layer output. The trainer network output for the training input may be a soft output, that is, an output that includes respective probabilities for each of multiple possible target outputs, rather than indicating a single target output.

The system determines gradients of one or more loss functions based on the projection network output (e.g., as described in 504), the trainer network output (e.g., as described in 506), or both (508). The system may determine the gradients by backpropagation, backpropagation through time, truncated backpropagation through time, or any other appropriate method.

For example, the system may determine a gradient, with respect to the trainer network parameters, of a trainer prediction loss function $\mathcal{L}_\theta$ that depends on an error between the trainer network output and the target output corresponding to the training example. The trainer prediction loss function encourages the trainer network to generate an output (i.e., in response to processing the training input) that is more similar to the target output.

As another example, the system may determine a gradient, with respect to the projection network parameters, of a projection prediction loss function $\hat{\mathcal{L}}^p$ that depends on an error between the projection network output and the target output corresponding to the training example. The projection prediction loss function encourages the projection network to generate an output (i.e., in response to processing the training input) that is more similar to the target output.

As another example, the system may determine a gradient, with respect to the projection network parameters (and in particular, the projection layer parameters), of a projection simulation loss function $\mathcal{L}^p$ that depends on an error between the trainer network output and the projection network output. The projection simulation loss function encourages the projection network to generate an output (i.e., in response to processing the training input) that is more similar to the output generated by the trainer network. Optionally, particularly when the trainer network is not pre-trained, the system may further determine a gradient of the projection prediction loss function $\hat{\mathcal{L}}^p$ with respect to the trainer network parameters. The trainer network may be said to be pre-trained if, prior to training the projection network, the values of the trainer network parameters are updated one or more times based on a gradient of the trainer prediction loss function.

In some cases, the system may apply different weighting factors to the gradients of each of the loss functions (e.g., the trainer prediction loss function, the projection prediction loss function, and the projection simulation loss function). For example, the system may determine gradients with respect to the combined loss function given by:

$$\mathcal{L} = \lambda_1 \cdot \mathcal{L}_\theta + \lambda_2 \cdot \hat{\mathcal{L}}^p + \lambda_3 \cdot \mathcal{L}^p \quad (4)$$

where $\lambda_1$, $\lambda_2$, and $\lambda_3$ are weighting factors, $\mathcal{L}_\theta$ is the trainer prediction loss function, $\hat{\mathcal{L}}^p$ is the projection prediction loss function, and $\mathcal{L}^p$ is the projection simulation loss function.

In some cases, the values of the parameters of the projection layer functions (e.g., the components of the projection vectors) are predetermined, that is, are fixed before the projection network is trained, and are not adjusted during training. In these cases, when a gradient is determined with respect to the current parameter values of the projection network, the parameters of the projection layer functions are considered to be constants, and are not included in the gradient calculation.

The system updates the current values of the trainer network parameters and the projection network parameters based on the gradients (i.e., as determined in 508) (510). More specifically, the system may update the values of the projection network parameters based on the gradients of the projection prediction loss function and the projection simulation loss function (as described earlier). The system may update the values of the trainer network parameters based on the gradient of the trainer prediction loss function and, optionally, the projection simulation loss function (as described earlier).

The system may update the current value of a network (i.e., trainer network or projection network) parameter $\alpha$ by:

$$\alpha \leftarrow \alpha - r \cdot g \qquad (5)$$

where r is a learning rate hyper-parameter (i.e., a hyper-parameter that governs how quickly a parameter value can change during training) and g is the gradient with respect to the parameter $\alpha$.

As described earlier, by updating the trainer network parameter and the projection network parameters based on the gradients, the system can cause the trainer network and the projection network to generate respective outputs in response to processing the training input that are more similar to the target output. Additionally, particularly when the trainer network output is a soft output, the system can cause the output generated by the projection network in response to processing a training input to become more similar to the output generated by the trainer network in response to processing the same training input. This can cause the performance (e.g., prediction accuracy) of the trained projection network to be similar to that of the trainer network, despite the trainer network being a more complex model (e.g., having more parameters) than the projection network.

The system determines whether the training is complete (512). In some cases, the system determines the training to be complete if a predetermined number of training iterations are complete. In some cases, the system determines the training to be complete if the values of the trainer network parameters, the projection network parameters, or both have converged (e.g., if a measure of the change in the values of the parameters between iterations falls below a predetermined threshold).

In response to determining that the training is not complete, the system returns to 502 and performs another training iteration by repeating the preceding steps.

In response to determining that the training is complete, the system may store the trained values of the network parameters (e.g., in a logical data storage area or on a physical data storage device) (514). Alternatively, the system may provide the trained values of the trainer network parameters and the projection network parameters for use in processing network inputs (516). For example, the projection network (i.e., as defined by the trained values of the projection network parameters) may be deployed to a resource constrained environment (e.g., a mobile device) with limited memory and computational capacity. In some cases, the projection network may be deployed to resource constrained environments where the trainer network could not be deployed, due to greater resource demands (e.g., for memory, computing power, or both) of the trainer network (i.e., since it is a more complex model than the projection network).

As mentioned above, the system 100 described herein is widely applicable and is not limited to one specific implementation. However, other examples of specific implementations (in addition to those described above) may be as described below.

For example, if the inputs to the projection neural network 102 are Internet resources (e.g., web pages), documents, or portions of documents or features extracted from Internet resources, documents, or portions of documents, the output generated by the projection neural network 102 for a given Internet resource, document, or portion of a document may be a score for each of a set of topics, with each score representing an estimated likelihood that the Internet resource, document, or document portion is about the topic.

As another example, if the inputs to the projection neural network 102 are features of an impression context for a particular advertisement, the output generated by the projection neural network 102 may be a score that represents an estimated likelihood that the particular advertisement will be clicked on.

As another example, if the inputs to the projection neural network 102 are features of a personalized recommendation for a user, e.g., features characterizing the context for the recommendation, e.g., features characterizing previous actions taken by the user, the output generated by the projection neural network 102 may be a score for each of a set of content items, with each score representing an estimated likelihood that the user will respond favorably to being recommended the content item.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for processing a projection network input using a projection neural network to generate a prediction characterizing the projection network input, wherein the projection neural network includes one or more neural network layers, wherein the projection neural network includes a projection layer, the method comprising:
   receiving the projection network input;
   determining a projection layer input to the projection layer based on the projection network input;
   processing the projection layer input using the projection layer to generate a projection layer output, comprising:
      for each of a plurality of projection layer functions:
         processing the projection layer input in accordance with respective projection function parameters of the projection layer function to project the projection layer input to a lower dimensionality projection function output having a plurality of components that each assume a respective value from a finite set of possible values,
         wherein values of the projection function parameters were not adjusted during training of the projection neural network;
      processing the projection function outputs in accordance with projection layer parameters to generate the projection layer output,
      wherein values of the projection layer parameters were adjusted during the training of the projection neural network; and
   determining the prediction characterizing the projection network input based on the projection layer output.

2. The method of claim 1, wherein the values of the projection layer parameters are random values that are determined before the projection neural network is trained.

3. The method of claim 1, wherein the finite set of possible values is a set of two possible values.

4. The method of claim 3, wherein the finite set of possible values is {0,1}.

5. The method of claim 1, wherein the projection layer input has a plurality of components that each assume a respective value from a continuous set of possible values.

6. The method of claim 1, wherein determining the prediction characterizing the projection network input based on the projection layer output comprises:
   processing the projection layer output using an output layer of the projection neural network to generate the prediction characterizing the projection network input.

7. The method of claim 6, wherein the output layer is a softmax output layer.

8. The method of claim 6, wherein the projection neural network includes only: (i) one or more projection layers, and (ii) the output layer.

9. The method of claim 1, wherein the projection neural network includes only projection layers.

10. The method of claim 1, wherein the projection layer input matches the projection network input.

11. The method of claim 1, wherein the projection neural network includes a plurality of projection layers.

12. The method of claim 11, wherein the plurality of projection layers are arranged in a sequence of consecutive projection layers.

13. The method of claim 1, wherein for each of the plurality of projection layer functions, the projection function parameters of the projection layer function comprise a respective set of projection vectors, and wherein processing the projection layer input in accordance with the respective projection function parameters of the projection layer function to project the projection layer input to the lower dimensionality projection function output comprises, for each projection vector:
   determining a dot product between the projection layer input and the projection vector;
   when the dot product is negative, assigning a first value from the finite set of possible values to a corresponding component of the projection function output; and
   when the dot product is positive, assigning a second value from the finite set of possible values to the corresponding component of the projection function output.

14. The method of claim 1, wherein for each of the plurality of projection layer functions, the projection function parameters of the projection layer function are encoded as sparse matrices.

15. The method of claim 1, wherein the projection layer parameters include a parameter matrix and a bias vector, and wherein processing the projection function outputs in accordance with the projection layer parameters to generate the projection layer output comprises:
   applying the parameter matrix to the projection function outputs and then adding the bias vector to the result.

16. The method of claim 1, wherein the projection neural network is trained by a plurality of operations comprising:
   receiving a training network input and a target output for the training network input;
   processing the training network input using the projection neural network in accordance with: (i) current values of the projection layer parameters, and (ii) values of the projection function parameters which are determined before the projection neural network is trained and are not adjusted during training of the projection neural network, to generate a prediction characterizing the training network input;

processing the training network input using a trainer neural network having a plurality of trainer neural network parameters, wherein the trainer neural network is configured to process the training network input in accordance with current values of the trainer neural network parameters to generate a trainer network output; and determining a gradient with respect to the trainer neural network parameters of a loss function that depends on an error between the target output and the trainer network output;

determining a gradient with respect to the projection layer parameters of a loss function that depends on an error between the trainer network output and the prediction generated by the projection neural network for the training network input; and determining updates to the current values of the trainer network parameters and the projection layer parameters using the gradients.

17. The method of claim 16, wherein the trainer network output is a soft target output.

18. The method of claim 16, wherein the operations further comprise:

determining a gradient with respect to the trainer network parameters of the loss function that depends on the error between the trainer network output and the prediction generated by the projection neural network for the training network input, wherein the update to the current values of the trainer network parameters is also based on the gradient with respect to the trainer network parameters of the loss function that depends on the error between the trainer network output and the prediction generated by the projection neural network for the training network input.

19. A system comprising:

one or more computers; and one or more storage devices communicatively coupled to the one or more computers, wherein the one or more storage devices store instructions that, when executed by the one or more computers, cause the one or more computers to perform operations for processing a projection network input using a projection neural network to generate a prediction characterizing the projection network input, wherein the projection neural network includes one or more neural network layers, wherein the projection neural network includes a projection layer, the operations comprising:

receiving the projection network input;

determining a projection layer input to the projection layer based on the projection network input;

processing the projection layer input using the projection layer to generate a projection layer output, comprising:

for each of a plurality of projection layer functions:

processing the projection layer input in accordance with respective projection function parameters of the projection layer function to project the projection layer input to a lower dimensionality projection function output having a plurality of components that each assume a respective value from a finite set of possible values, wherein values of the projection function parameters were not adjusted during training of the projection neural network;

processing the projection function outputs in accordance with projection layer parameters to generate the projection layer output, wherein values of the projection layer parameters were adjusted during the training of the projection neural network; and determining the prediction characterizing the projection network input based on the projection layer output.

20. One or more non-transitory computer storage media storing instructions that when executed by one or more computers cause the one or more computers to perform operations for processing a projection network input using a projection neural network to generate a prediction characterizing the projection network input, wherein the projection neural network includes one or more neural network layers, wherein the projection neural network includes a projection layer, the operations comprising:

receiving the projection network input;

determining a projection layer input to the projection layer based on the projection network input;

processing the projection layer input using the projection layer to generate a projection layer output, comprising:

for each of a plurality of projection layer functions:

processing the projection layer input in accordance with respective projection function parameters of the projection layer function to project the projection layer input to a lower dimensionality projection function output having a plurality of components that each assume a respective value from a finite set of possible values, wherein values of the projection function parameters were not adjusted during training of the projection neural network;

processing the projection function outputs in accordance with projection layer parameters to generate the projection layer output, wherein values of the projection layer parameters were adjusted during the training of the projection neural network; and determining the prediction characterizing the projection network input based on the projection layer output.

* * * * *